United States Patent
Belmares et al.

(12)

(10) Patent No.: US 6,906,132 B2
(45) Date of Patent: Jun. 14, 2005

(54) LOW FORMALDEHYDE EMISSION COATINGS AND BINDERS FROM FORMALDEHYDE-BASED RESINS

(75) Inventors: Hector Belmares, Lancaster, PA (US); Kenneth G. Caldwell, Mountville, PA (US)

(73) Assignee: AWI Licensing Company, Wilmington, DE (US)

( * ) Notice: Subject to any disclaimer, the term of this patent is extended or adjusted under 35 U.S.C. 154(b) by 86 days.

(21) Appl. No.: 10/033,625

(22) Filed: Dec. 27, 2001

(65) Prior Publication Data

US 2003/0099850 A1 May 29, 2003

Related U.S. Application Data

(60) Provisional application No. 60/317,043, filed on Sep. 4, 2001.

(51) Int. Cl.[7] ............................. C08L 89/00; C08L 61/00
(52) U.S. Cl. ........................................ 525/54.1; 525/400
(58) Field of Search ................................. 525/54.1, 400

(56) References Cited

U.S. PATENT DOCUMENTS

| 4,346,181 A | 8/1982 | Allan .......................... 521/136 |
| 5,362,842 A | 11/1994 | Graves et al. .............. 528/262 |
| 5,705,537 A | 1/1998 | Hartman, Jr. et al. ...... 521/84.1 |

FOREIGN PATENT DOCUMENTS

| CH | 319247 | 2/1957 | |
| EP | 0 704 485 A2 | 4/1996 | ........... C08L/61/28 |
| NL | 1003133 | 2/1998 | ............ C08H/1/00 |

*Primary Examiner*—Ana Woodward

(57) ABSTRACT

Disclosed is a low formaldehyde emission coating from formaldehyde-based resins that can be applied to a panel for reducing sag and enhancing the strength of the panel. Formaldehyde emissions are reduced by the inclusion of polymeric formaldehyde reactive materials comprising a polyamide scavenger into the coating formula. These formulations are useful as coatings or binders.

9 Claims, No Drawings

LOW FORMALDEHYDE EMISSION COATINGS AND BINDERS FROM FORMALDEHYDE-BASED RESINS

RELATED APPLICATION

This application is a non-provisional application claiming benefit of Provisional Application Ser. No. 60/317,043, filed Sep. 4, 2001, the content of which is hereby incorporated in its entirety.

FIELD OF INVENTION

The present invention relates to low formaldehyde emission formaldehyde resin based coatings and board binders, and more particularly to formaldehyde resin-based coatings and binders for panels that contain a polyamide scavenger.

BACKGROUND

Acoustical panels are used for a variety of different purposes and are comprised of an array of different fibers, binders and fillers. Primarily, fibrous panels are made from mineral wool, perlite, cellulosic fibers, fillers and binders.

Panel production utilizes combinations of fibers, fillers, bulking agents, binders, water, surfactants and other additives mixed into a slurry and processed into a panel. Examples of fibers used may include mineral wools, fiberglass, and cellulosic material. Cellulosic material is typically in the form of newsprint. Added fillers may include expanded perlite, brighteners, such as titanium oxide, and clay. Examples of binders used in fibrous panels include starch, latex and reconstituted paper products which link together and create a binding system locking all ingredients into a structural matrix.

Organic binders, such as starch, are often the primary component providing structural adhesion for the panel. Starch is a preferred organic binder because it is relatively inexpensive. For example, panels containing newsprint, mineral wool and perlite can be bound together by starch. Starch imparts both strength and durability to the panel structure, but is susceptible to moisture which can cause the panel to soften and sag. Thus, boards containing starch and cellulose are susceptible to atmospheric moisture, which can lead to the weakening of the panel.

One method used to counter the sagging of acoustical panels is to coat the panels with a formaldehyde resin based coating. When formaldehyde resin based coatings are exposed to moisture or humidity they tend to expand which can prevent sagging. Example formaldehyde resins include melamine formaldehyde, as well as other formaldehyde based resins (phenyl formaldehyde and urea formaldehyde) that can be crosslinked.

Cured formaldehyde resins contain residual methylol end groups that have a high affinity for water and the resin has a flexible crosslink structure that can expand as the coating picks up moisture by virtue of hydrogen bonding. When a formaldehyde resin based coating is applied to the back of an acoustical panel, the coating expands in humid conditions and the force created by the expansion of the back of the panel counteracts the sagging force of gravity. However, formaldehyde resins tend to emit into the atmosphere formaldehyde in the usually thermal curing process. As it is well known, formaldehyde is an environmental irritant.

To control formaldehyde emissions, the addition of formaldehyde reactive materials, such as urea, have been used to scavenge the free formaldehyde. Unfortunately, such small molecule scavengers end cap the reactive groups of the formaldehyde resin, thus preventing significant levels of crosslinking from occurring. As a result, the characteristic highly crosslinked elastic polymer structure is never formed.

The resulting coating is weak and will not expand significantly upon exposure to humidity, and therefore the coated panel's resistance to sag is greatly impaired.

One method relating to polymeric formaldehyde scavengers for formaldehyde based resins can be found in U.S. Pat. No. 5,705,537 to Hartman, et al. This patent teaches that protein materials and other formaldehyde scavengers were used to reduce the formaldehyde emission of phenol formaldehyde resole foam in its finished state during customer use at room temperature and not during the foam manufacturing process where organic solvents might also be involved. In the above-mentioned patent, the formaldehyde scavengers are an add-on to the foam before customer use. However, sag and humidity resistance change of the foam due to the presence of the formaldehyde scavengers are of no importance for the above-mentioned patent because the formaldehyde scavengers are a heterogeneous mixture with the foam. In the present invention, the materials are coatings or binders, and not foams, and are totally waterborne. For the present invention, the formaldehyde scavenging occurs throughout the usually thermal curing process of the coatings or binders where the formaldehyde is kinetically energized and much harder to scavenge. In addition, the above-mentioned patent does not comprise natural polyamides like soy protein or any synthetic polyamides like polyacrylamide.

SUMMARY

The present invention comprises a low formaldehyde emission formaldehyde based resin coating and board binder and a low formaldehyde emission coated and bound panel. Furthermore, a method of coating or binding a panel with a low formaldehyde emission coating or binder and a method for making the coating or binder are included. The present invention reduces formaldehyde emissions by the inclusion of polymeric formaldehyde reactive materials comprising a polyamide scavenger into the coating or binder formula. The low formaldehyde emission coating provides sag resistance in coated acoustical panels and added strength to both acoustical and nonacoustical panels.

In an embodiment, the present coating includes a formaldehyde resin and a polyamide scavenger. The formaldehyde resin may be selected from the group of melamine formaldehyde, urea formaldehyde, phenol formaldehyde or combinations of the group. The polyamide scavenger may be either a synthetic polyamide or a natural polyamide. Synthetic polyamides may include polyacrylamides, polymethacrylamides, polyamide telomers, copolymers, terpolymers, tetrapolymers, N-substituted polyamides and combinations thereof. Natural polyamides include proteins such as casein or soy protein. The coating may also contain other additives such as a base, acid catalyst and a surfactant.

A further embodiment includes a method of making a coating or binder comprising the steps of combining a formaldehyde resin and a polyamide scavenger. The polyamide scavenger is a polymeric formaldehyde reactive material selected from synthetic or natural polyamides or combinations of the two. The polyamides may be selected from the group of polyacrylamides, polymethacrylamides, polyamide telomers, copolymers, terpolymers, tetrapolymers, N-substituted polyamides, proteins and combinations thereof.

An added embodiment includes a coated panel comprising a panel having a backing and facing side with a coating layer affixed to the backing side. The coating layer comprises a formaldehyde based resin and a polyamide scavenger. In the case of an acoustical panel, the coating is applied to the back of the panel to prevent sagging.

An additional embodiment includes a method of coating a panel including the steps of applying a coating comprising a formaldehyde resin and a polyamide scavenger to a panel. The coating may be applied by such methods as roll coating, spraying, curtain, extrusion, knife coating and combinations thereof.

In an additional embodiment, a board binder comprising a formaldehyde based resin and a polyamide scavenger is used to bind together composite panels, including boards made from mineral fiber, wood fiber, cellulose fiber, fiberglass, other natural or synthetic fibers, and mixtures thereof, as well as particle board, and plywood.

As used herein, the terms "formaldehyde resin" and "formaldehyde based resin" refer to any polymeric formulation capable of cross-linking and which contain formaldehyde moieties or can release formaldehyde moieties from the polymer structure.

DETAILED DESCRIPTION

The present invention comprises a low formaldehyde emission formaldehyde based resin coating that can be applied to a panel for reducing sag and enhancing the strength of the panel. Formaldehyde emissions are reduced by the inclusion of polymeric formaldehyde reactive materials comprising a polyamide scavenger into the coating formula.

The polyamide scavengers can preserve much of the crosslinked formaldehyde resin structure with an affinity towards water similar to the formaldehyde resin. The polyamide scavengers include various proteins and other oligomeric or polymeric polyamides. These scavengers can react with the formaldehyde normally emitted from the crosslinking reaction of the formaldehyde resin, and at the same time become part of the finished crosslinked polymer. The reaction with the formaldehyde locks in the formaldehyde, thus preventing it from being released into the atmosphere as an irritant.

The crosslink structure formed by the resin including the scavenger is substantially similar to the structure formed by the same resin without the scavenger, and exhibits substantially the same high modulus and degree of expansion upon exposure to moisture. The applied coating with the added scavenger exhibits the same acoustical panel sag performance as one without the scavenger, but the emitted formaldehyde is reduced significantly. For example, emitted formaldehyde may be reduced by as much as 70% or more, as compared to the same coating without the scavenger added.

Natural polyamides such as proteins of almost any type, including soy protein or casein may also be used as a scavenger. However, proteins tend to raise the viscosity of the coating. Proteins may be chemically treated to either decrease the molecular weight or to introduce additional chemical functionality. For example, casein can be chemically treated to decrease the molecular weight to obtain sodium caseinate. Typically, the monomeric part of a protein is not used.

The polyamide scavengers may include dimers, trimers, oligomers, telomers, and polymers. Upper range of the molecular weight value for the scavenger is limited by the viscosity desired for the coating. This is particularly important in the application of the coating to a panel. Specifically, the viscosity can be as high as the particular method of coating can use. Spraying is the most sensitive to viscosity, but other methods which are less sensitive may be used for greater viscosity polyamides.

The coatings may further contain water, a dispersant, a mineral filler, a latent acid catalyst, and a base in addition to the formaldehyde resin. At elevated temperatures the base evaporates and the coating mixture becomes acidic, which catalyses the self condensation reaction of the formaldehyde resin.

The formaldehyde emission reduction with the polyamide scavenger can be effective with most formaldehyde based resins including melamine formaldehyde, urea formaldehyde, phenol formaldehyde, and mixtures thereof. Polyamide scavengers can include oligomeric amides, polymeric amides, most proteins such as soy and milk protein (casein), polyacylamides, other polymeric amides, and mixtures thereof. The polyamide scavenger have good reactivity with formaldehyde to reduce the emissions, and the ability to maintain a large crosslinked structure for excellent modulus and have high moisture affinity to provide the expansion of the cured coating on exposure to humidity. High modulus and expansion with humidity provides for good acoustical ceiling panel sag performance. The effective range of the synthetic polyamide scavengers is from about 3% to about 40%, from about 5% to about 25%, and from about 8% to about 15% (dry weight of scavenger per dry weight of formaldehyde resin). The effective range for the protein polymeric scavengers is from about 5% to about 50%, from about 10% to about 40%, and from about 20% to about 30% (dry weight scavenger per dry weight of formaldehyde resin). The filler can be of almost any type of filler such as solid polymer particles, hollow beads, perlite, calcium carbonate, clay, dolomite, sand, barium sulfate, mica, silica, talc, gypsum, wollastonite, calcite, aluminum trihydrate, zinc oxide, zinc sulfate, and mixtures thereof.

The sag resistant coatings may be applied to the acoustical panels at a rate of at least 10 g/sqft wet (@50% solids) to provide for good sag performance under high humidity conditions. In an embodiment the coating is applied to the backside of the acoustical panel. Typical application rates include from about 17–20 g/sqft, with some applications as high as about 200 g/sqft. The coating can be applied by roll coating, spraying, curtain, extrusion, knife coating and other known methods. The coating can be thermally cured. For example the coating may be cured at temperatures ranging from about 450° F. to about 650° F. and for a duration as short as 3 minutes. Generally, the coating surface temperature reaching about 380° F. is indicative of a full cure.

EXAMPLES

Formaldehyde Emissions and Sag Performance

To measure the formaldehyde emissions in the following examples, the liquid coating samples were run through a thermogravimetric analysis procedure. The formulations are illustrated in the tables labeled samples 1, 2 and 3. The thermogravimetric analysis procedure includes capturing the evolved formaldehyde using a 2,4-dinitrophenylhydrazine (DNPH) cartridge. The DNPH cartridge is washed with acetonitrile, diluted to a 5 ml volume, and the 2,4-dinitrophenylhydrazone derivative of formaldehyde is analyzed by liquid chromatography. The TGA conditions included heating the sample in air from room temperature to 230° C. at a heating rate of 5° C. per minute. Results in Table 1 are reported in micro g per mg of sample and are compared to the control sample results. All tests were done with four separate runs representing two separate mixes, and the control was run at the beginning and end of the series.

The SAG Standard 4 Cycle test is used to determine the effects of humidity, temperature, and gravity on the deformation characteristics of ceiling materials in an installed position. The samples are placed in a grid in a temperature and humidity controlled room. Each of four cycles consists of 17 hr @ 82° F./90 RH and 6 hr 82° F./35 RH. Center point deflection is measured initially and after each segment of the cycle. For acceptable sag performance the board should not sag more than 0.125" after 4 cycles.

TABLE 1

Sag Performance and Emitted Formaldehyde Measurements:

| Backcoating Description: Additive by weight based on Melamine Formaldehyde. (Additive by weight on total coating) | Sag Performance on Minaboard with Standard Face Coatings. Inches | Average Emitted Formaldehyde (4 Tests/2 Mixes) micro g/mg | Change in Emitted Formaldehyde vs Control % |
|---|---|---|---|
| Melamine Formaldehyde Control Coating | −75 | 1.78 | — |
| Industrial Casein = +25% (+2.5%) | −62 | 0.43 | −76 |
| ProCote = +25% (+2.5%) | −106 | 0.95 | −47 |
| ProCote 184A = +25% (+2.5%) | −62 | 1.08 | −40 |
| ProCote PX 358 = +25% (+2.5%) | −86 | 0.45 | −75 |
| Polyacrylamide = +10% (+2% (50% solids)) | −78 | 0.57 | −68 |

Sample Coatings

Sample 1 Coating with Polyacylamide Scavenger:

| Ingredient | Description | Manufacturer | Address | Weight - Wet | Weight - dry |
|---|---|---|---|---|---|
| Water | | | | 3432.8 | 0.00 |
| Tetrasodium Pyrophosphate | TSPP Dispersant | FMC Corp. | Philadelphia, PA | 3.8 | 3.8 |
| Melamine Formaldehyde | BTLM 860 | BTL Specialty Resins Corp. | Toledo, OH | 1057.6 | 1052.3 |
| Triethylamine | TEA Base | Air Products | Allentown, PA | 42.3 | 0.00 |
| Clay Slurry | EG-44 Slurry | Theile Kaolin Co. | Sandersville, GA | 6028.8 | 4220.1 |
| Ammonium Sulfate | Latent Acid catalyst | Allied Signal, Inc. | Hopewell, VA | 10.6 | 10.5 |
| Polyacrylamide | Polymeric Scavenger | Sigma Aldrich | Milwaukee, WI | 211.5 | 105.8 |
| TOTAL | | | | 10787.4 | 5392.5 |

% Solids=50

Filler/Binder=4.0

Density lb/gal=11.0

PVC=60

The dry addition of the polyacrylamide is 10% by weight of the dry melamine formaldehyde. This formula provided a 68% reduction in emitted formaldehyde through the curing process as compared to the same formula without the polyacrylamide.

Sample 2 Coating with Soy Protein Scavenger:

| Ingredient | Description | Manufacturer | Address | Weight - Wet lb. | Weight - dry lb. |
|---|---|---|---|---|---|
| Water | | | | 3432.8 | 0.00 |
| Tetrasodium Pyrophosphate | TSPP Dispersant | FMC Corp. | Philadelphia, PA | 3.8 | 3.8 |
| Melamine Formaldehyde | BTLM 860 | BTL Specialty Resins Corp. | Toledo, OH | 1057.6 | 1052.3 |
| Triethylamine | TEA Base | Air Products | Allentown, PA | 42.3 | 0.00 |
| Clay Slurry | EG-44 Slurry | Theile Kaolin Co. | Sandersville, GA | 6028.8 | 4220.1 |
| Ammonium Sulfate | Latent Acid catalyst | Allied Signal, Inc. | Hopewell, VA | 10.6 | 10.5 |
| ProCote | Soy Protein Scavenger | Protein Technologies | St Louis, MO | 263.1 | 263.1 |
| TOTAL | | | | 10839.0 | 5549.8 |

% Solids=51.1
Filler/Binder=4.0
Density lb/gal=11.2
PVC=59

In this sample 25% soy protein by dry weight based on melamine formaldehyde dry weight was added. This formula provided a 47% reduction in emitted formaldehyde vs. the same formula without soy protein.

Sample 3 Coating with Industrial Casein Scavenger:

| Ingredient | Description | Manufacturer | Address | Weight - Wet lb. | Weight - dry lb. |
|---|---|---|---|---|---|
| Water | | | | 3432.8 | 0.00 |
| Tetrasodium Pyrophosphate | TSPP Dispersant | FMC Corp. | Philadelphia, PA | 3.8 | 3.8 |
| Melamine Formaldehyde | BTLM 860 | BTL Specialty Resins Corp. | Toledo, OH | 1057.6 | 1052.3 |
| Triethylamine | TEA Base | Air Products | Allentown, PA | 42.3 | 0.00 |
| Clay Slurry | EG-44 Slurry | Theile Kaolin Co. | Sandersville, GA | 6028.8 | 4220.1 |
| Ammonium Sulfate | Latent Acid catalyst | Allied Signal, Inc. | Hopewell, VA | 10.6 | 10.5 |
| Industrial Casein | Casein | Prestige Proteins | Delray Beach, FL | 263.1 | 263.1 |
| Casein | Protein Scavenger | | | | |
| TOTAL | | | | 10839.0 | 5549.8 |

% Solids=51.1
Filler/Binder=4.0
Density lb/gal=11.2
PVC=59

In this sample, casein protein 25% by dry weight based on dry weight of melamine formaldehyde was added. This formula provided a 76% reduction in emitted formaldehyde vs. the same formula without casein.

MOE and MOR Strength Tests

The measure of performance of the formaldehyde resin as a coating or a binder can be measured by using the Modulus of Rupture and Modulus of Elongation measurements for building materials like boards made from mineral fiber, wood fiber, fiberglass, as well as particle board or plywood at high humidity (90 RH). Table 2 contains relative strength data generated by applying the 20 g/sqft (wet @ 50% solids) of coating to both sides of mineral fiberboard and then thermal curing, both with and without the various scavengers. The boards where exposed for 48 hours at 90 RH, and then broke on an Instron to generate modulus numbers as follows:

TABLE 2

Strength Measurements

| Material Description | MOR / Modulus of Rupture / psi | MOE / Modulus of Elongation / psi |
|---|---|---|
| Standard Melamine Formaldehyde | 72.9 | 24188 |
| Melamine Formaldehyde plus Urea @ 10% | 62.4 | 17423 |
| Melamine Formaldehyde plus Soy Protein @ 25% | 76.0 | 25481 |
| Melamine Formaldehyde plus Polyacrylamide @ 10% | 75.7 | 24115 |

As illustrated in Table 2, the urea scavenger (small molecule) resulted in a much weaker board (lower MOR & MOE) than the control melamine formaldehyde. The samples with polymeric scavengers (soy protein and polyacrylamide) did as good or better than the control melamine formaldehyde. Higher board strengths are obtained when the formaldehyde resin is scavenged with a polymeric scavenger rather than a small molecule scavenger, like urea. The crosslinked structure is maintained, and sometimes even enhanced by the inclusion of the scavenger material into the crosslinked structure.

What is claimed is:

1. A method of making a coating comprising:
   providing a formaldehyde resin;
   providing a formaldehyde scavenger, the formaldehyde scavenger being a polyamide;
   combining the resin and scavenger;
   heating the resin and scavenger at a temperature in the range from about 450° F. to about 650° F.

2. The method of claim 1, wherein the polyamide is a synthetic polyamide.

3. The method of claim 2, wherein the synthetic polyamide is selected from the group consisting essentially of polyacrylamides, polymethacrylamides, polyamide telomers, polyamide polymers, polyamide copolymers, polyamide terpolymers, polyamide tetrapolymers, N-substituted polyamides and combinations thereof.

4. The method of claim 2, wherein the protein is selected from the group consisting of casein, soy protein and combinations thereof.

5. The method of claim 1, wherein the polyamide is a protein.

6. The method of claim 1, wherein the formaldehyde resin is selected from the group consisting of melamine formaldehyde, urea formaldehyde, phenol formaldehyde and combinations thereof.

7. The method of claim 6, wherein the catalyst comprises an acid catalyst.

8. The method of claim 1, further including the components selected from the group consisting of catalysts, fillers, surfactants, buffers, viscosity controllers, pigments, flattening agents and combinations thereof.

9. The method of claim 1, wherein the coating comprises formaldehyde scavenger in an amount from about 3% to about 50% by dry weight based on the dry weight of the formaldehyde resin.

* * * * *